United States Patent

[11] 3,595,374

| [72] | Inventor | Homer G. Whitfield<br>Northville, Mich. |
|---|---|---|
| [21] | Appl. No. | 799,202 |
| [22] | Filed | Feb. 14, 1969 |
| [45] | Patented | July 27, 1971 |
| [73] | Assignee | Condeco Automation, Inc. |

[54] COLLECTING AND ELEVATING CONVEYOR
17 Claims, 8 Drawing Figs.

[52] U.S. Cl. ............................................ 198/50,
198/131, 198/159, 198/171, 198/203, 198/204
[51] Int. Cl. ...................................................... B65g 19/00
[50] Field of Search ............................................. 198/26, 43,
46, 50—52, 65, 66, 131, 169, 171, 204, 33.1;
214/16 B

[56] References Cited
UNITED STATES PATENTS

| 2,978,120 | 4/1961 | Agnello et al. | 198/171 X |
| 2,991,871 | 7/1961 | Lupo | 198/212 |
| 2,655,247 | 10/1953 | Carroll et al. | 198/33.1 |

Primary Examiner—Robert G. Sheridan
Attorney—Farley, Forster and Farley

ABSTRACT: The invention pertains to improvements in conveyors for carrying parts such as automobile valves. The invention eliminates the need for any special entrance or feeding apparatus to the conveyor. The conveyor configuration itself and the configuration of the parts provide for the proper acceptance of the parts into the conveyor. The invention also provides for a torque limiting drive incorporated with the conveyor such that in the event of a jam the conveyor automatically oscillates back and forth until the jammed part is released.

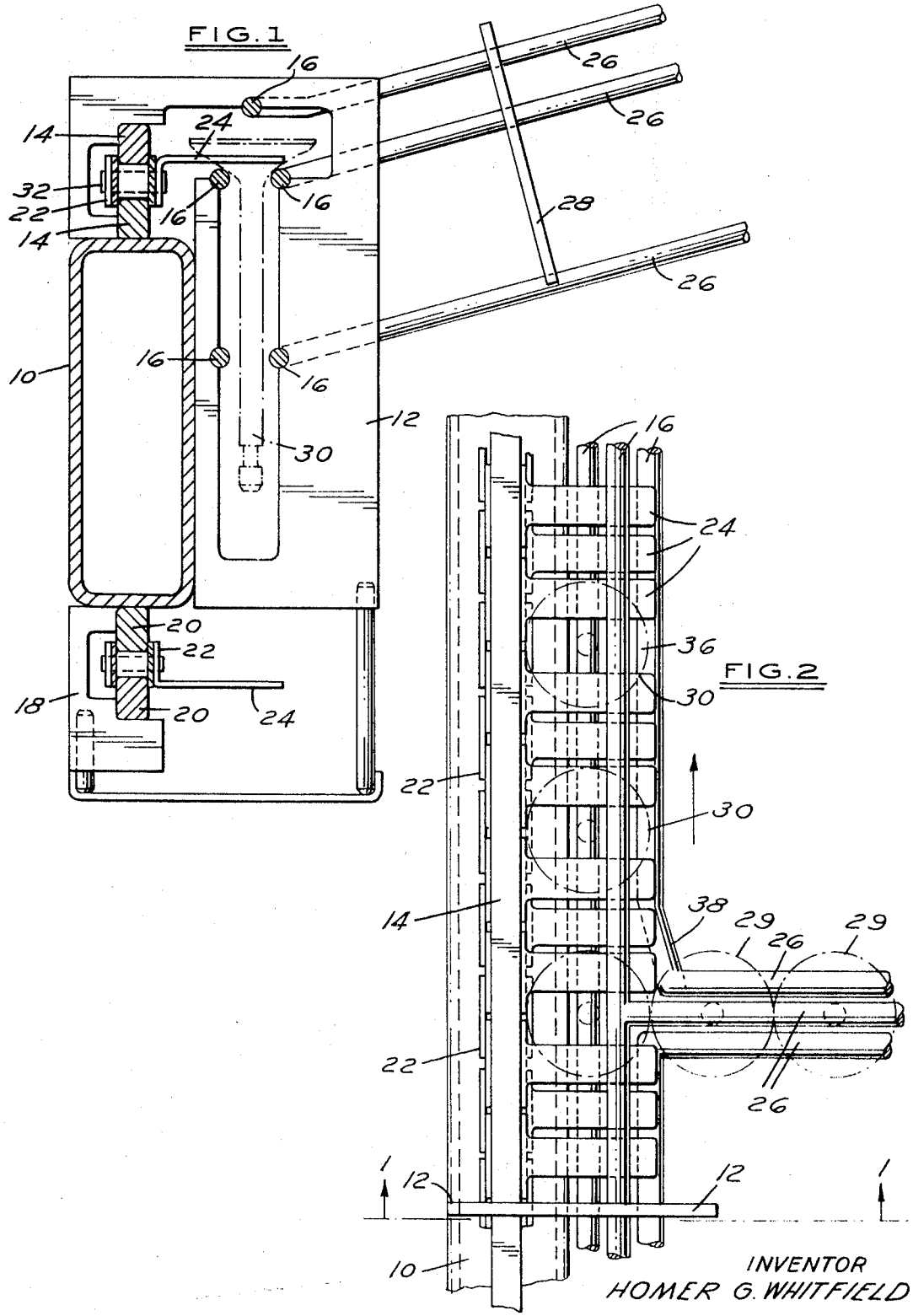

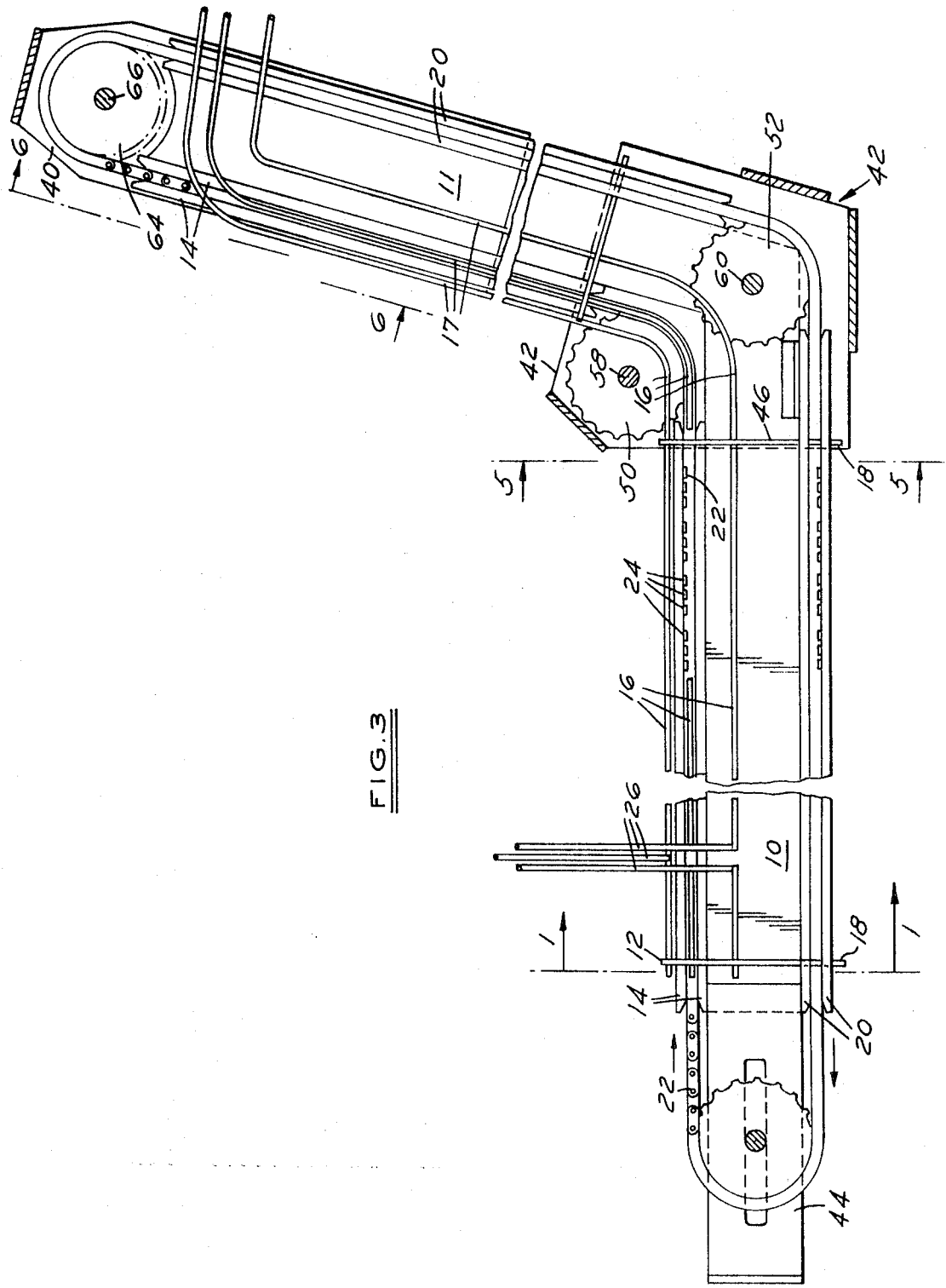

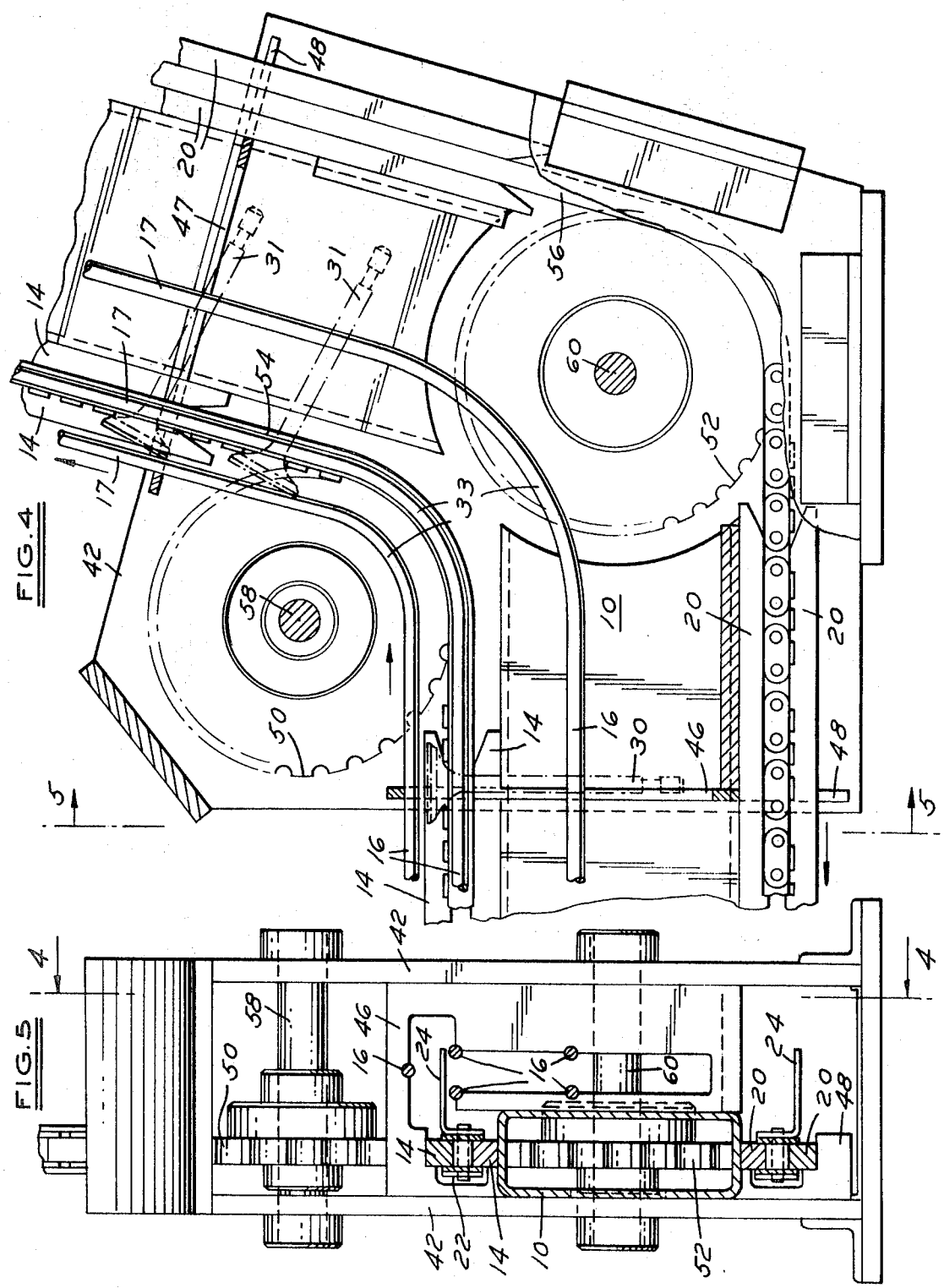

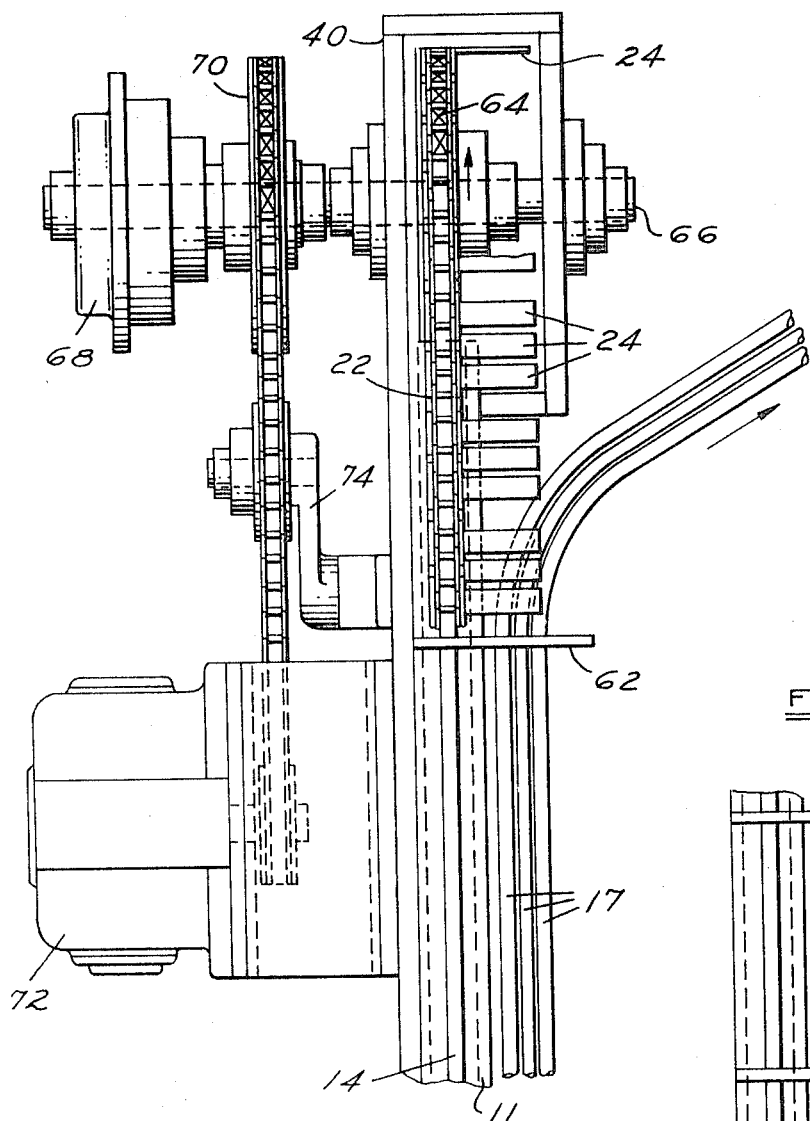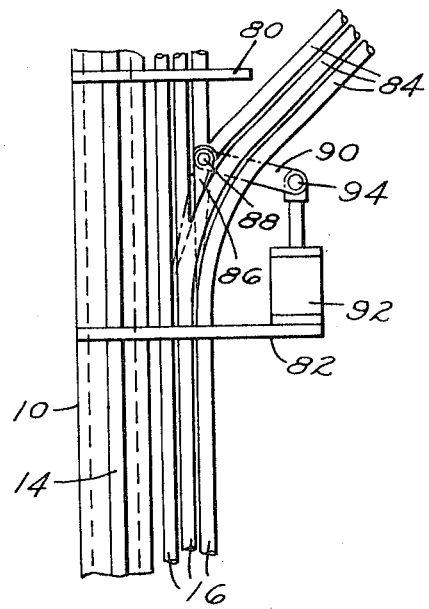

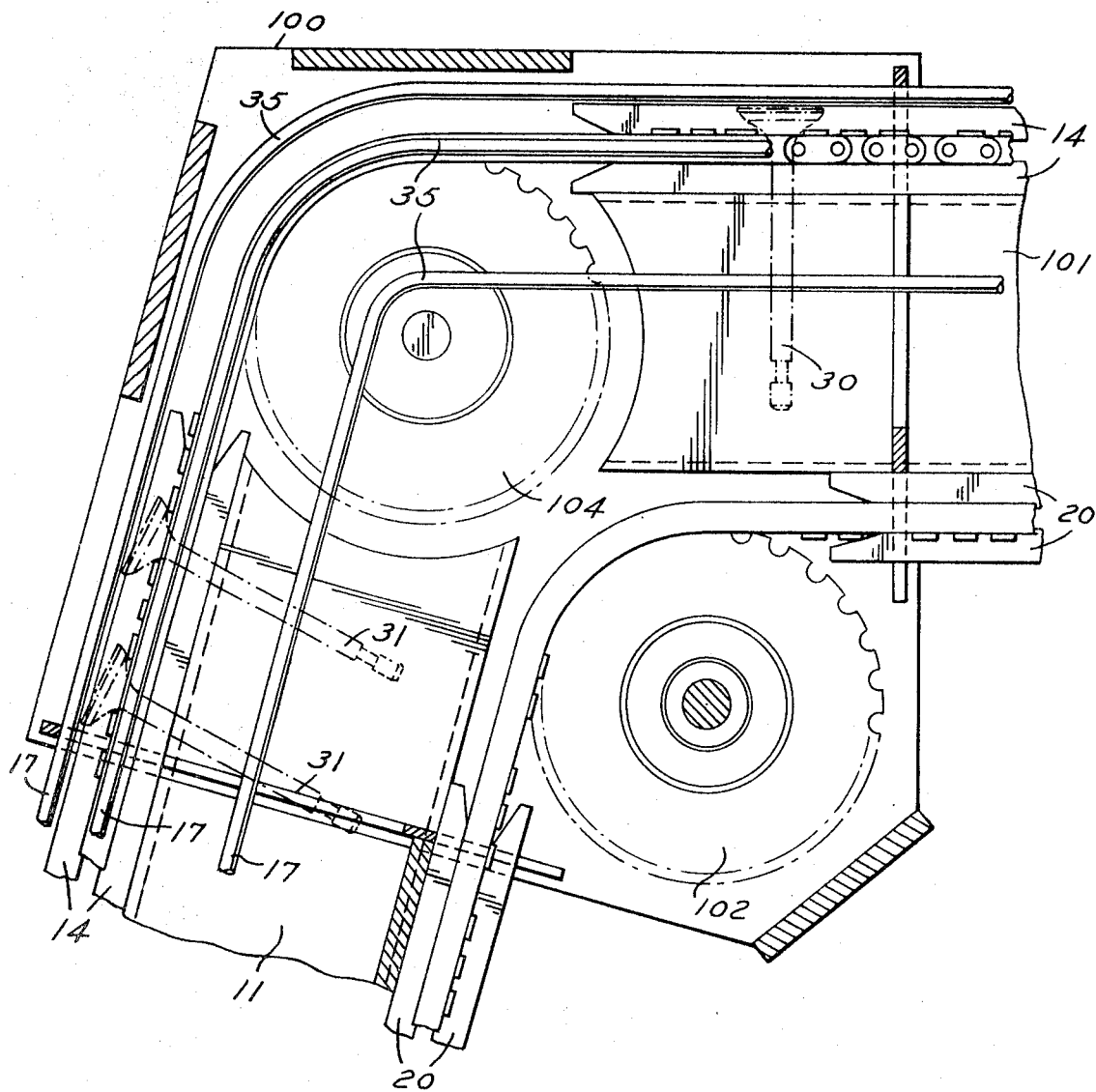

3,595,374

COLLECTING AND ELEVATING CONVEYOR

BACKGROUND OF THE INVENTION

In the mass production manufacture of parts such as engine valves, the sequence of operations may involve parallel manufacturing steps. For example, in the grinding of engine valves a given step may involve a grinding operation in any one of several grinding machines, all of these grinding machines performing the same operation. A subsequent operation may be another grinding operation on a different portion of the valve and again any one of several machines may grind a particular valve. In between operations engine valves must be collected and then redistributed in order to make the maximum use of each one of the grinding machines. Without this collection and redistribution the shutdown of one machine in one step might result in the shutdown of all machines in that particular series of operations, although parallel operations could continue. However, with collection and redistribution between each step the shutdown of one grinding machine will affect only that machine since valves that might have gone to that machine will be redistributed through the other grinding machines in that same operational step. While such collection and redistribution is not novel in and of itself the usual method is to load valves into a part carrier which then travels on a conveyor to the next series of machines where the valves are then unloaded. The loading and unloading operation involves a complicated apparatus for properly loading the valves into the part carrier and then subsequently properly unloading the valves from the part carrier. Jamming of the apparatus will result in a shutdown of the entire conveyor line.

SUMMARY OF THE INVENTION

The invention provides a chain driven conveyor with attachments that slide the parts along a guide track. Guide tracks from the previous parallel operations meet the conveyor guide track and the configuration of the attachments to the conveyor prevents a part sliding down an entering guide track from entering the conveyor guide track unless there is an open space for the part among the conveyor attachments. Thus, parts already in the conveyor guide track and the chain conveyor attachments prevent further parts from entering the conveyor unless there are open spaces for the parts. The parts will merely pile up at each entrance and only be admitted to the conveyor when an open space passes by. The configuration of the conveyor invention also allows for abrupt changes from the horizontal to an elevating conveyor configuration. The parts may either be discharged at the top of the elevating portion or a second horizontal portion of the conveyor may continue so as to allow for distribution points to the subsequent series of parallel operations. Distribution may be provided by a cam that directs the parts off the conveyor and that is actuated by an external signal. Such distribution cams are conventional in the art. However, the present conveyor invention allows distribution to take place either along a horizontal stretch of the conveyor or along the elevating portion of the conveyor.

An added feature of the conveyor is a torque limiting drive. In the event that a part does jam upon entering the conveyor or otherwise, the increased torque on the conveyor drive will cause the drive to intermittently slip. This intermittent slippage essentially shakes the whole conveyor drive chain and in actual operation unjams the conveyor in a matter of seconds, quite often in less than a second.

DESCRIPTION OF THE DRAWINGS

FIG. 1 is a typical cross section of the conveyor and as shown is taken along the line 1-1 of FIG. 2 just approaching a typical entrance;

FIG. 2 is a plan view of a typical entrance to the conveyor;

FIG. 3 is an overall view of the conveyor including both the horizontal and inclined portions of the conveyor;

FIG. 4 is a detail of the conveyor taken along the line 4-4 of FIG. 5 where the conveyor changes from horizontal to incline;

FIG. 5 is a cross section taken along the line 5-5 of FIG. 4 and indicates the guide and sprocket arrangement;

FIG. 6 indicates the top of the conveyor incline and the driving arrangement for the conveyor;

FIG. 7 is a plan view of a switch exit for an alternate version of the conveyor;

FIG. 8 is a side detail view of the elbow joining the inclined portion with an upper horizontal portion for an alternate version of the conveyor.

DESCRIPTION OF THE PREFERRED EMBODIMENT

This particular configuration of the invention was specifically designed for conveying engine valves from the discharges of a group of parallel grinding machines and elevating the valves so that they can be gravity fed into the next group of parallel grinding machines. In FIG. 1 a rectangular tube 10 forms the backbone of the conveyor. Mounted on the tube are brackets 12 which support both the chain guides 14 and the engine valve rod guides 16. A second set of brackets 18 supports the return guides 20 for the conveyor chain 22. Mounted on the conveyor chain 22 are L-shaped elements 24 which move the engine valves along. Also shown in FIG. 1 are the entrance guide rods 26 and a supporting bracket for these guide rods 28.

In FIG. 2 the tubular backbone 10 and supporting bracket 12 are shown. Engine valves 30 are shown schematically as they move along the conveyor. The elements 24 are fastened to the conveyor chain by the conveyor chain pins 32 as shown in FIG. 1. Thus, as shown in FIG. 2 the elements 24 move along between the upper three of the guide rods 16 and push the engine valves 30 along. The ends of the elements 24 prevent an engine valve sliding down the entrance rods 26 from entering into the conveyor except where a gap 36 is provided. When the gap is already filled with an engine valve from a previous entrance the engine valve itself prevents a second engine valve from entering the conveyor. Engine valves 29 merely stack along the entrance rods 26 until empty gaps pass by. The configuration allows one engine valve to enter each empty gap as it passes by. In order to facilitate the entrance of engine valves the lower guide rods abutting the entrance rods 26 on the downstream side are bent as shown at 38.

FIG. 3 indicates the overall side view of the horizontal and inclined portions of the backbone 10 and conveyor chain guides 14 and 20. The conveyor drive shown below in FIG. 6 is attached at the upper end of the conveyor 40. The change in direction of the conveyor at the elbow 42 is shown in more detail in FIGS. 4 and 5. Entrances as shown in FIGS. 1 and 2 may be placed along the horizontal portion of the conveyor as desired. An end sprocket conventional in the art is located at the lower end 44.

In FIG. 4 the elbow joint 42 joins the backbone tubes 10 and 11 for the horizontal and inclined portions. Guide rail brackets 46, 47 and 48 for the conveyor chain guide rails 14 and 20 align the conveyor chain as it engages the elbow sprockets 50 and 52. The conveyor chain forward and return is shown schematically by the lines 54 and 56. The sprocket 50 guides the conveyor chain from the upper surface. The guide rods 16 and 17 are bent at 33 to conform to the arc of the elbow such that the elements 24 attached to the conveyor chain can push the valves around the arc and continue on the incline as shown schematically at 31. In FIG. 5 the sprockets 50 and 52 turn freely on shafts 58 and 60 which in turn are mounted in the elbow 42.

In FIG. 6 at the upper end of the inclined portion of the conveyor 40 the guide rods 17 separate away from the backbone tube 11 of the conveyor just after the bracket 62. The guide rods 17 begin to slope downward after the bracket 62 and the engine valves are propelled by gravity from this point onwards. The conveyor chain continues around the driving sprocket 64 which is mounted on a drive shaft 66. The drive shaft 66 is propelled through a torque-limiting coupling 68 of a ratcheting-type and in turn this coupling is driven by the sprocket 70. Sprocket 70 in turn is driven by an electric motor and gear reducer 72 and the chain is kept tight by the chain tightener 74. In the event that an engine valve jams somewhere in the conveyor, the increased torque upon the torque limiting coupling 68 causes the coupling to intermittently release and engage and a resultant intermittent oscillating motion is imparted to the conveyor chain. Experience has shown that this oscillation shakes loose a jammed engine valve usually within a fraction of a second.

An alternate version of the conveyor may utilize exit switches as shown in FIG. 7 either on the inclined portion of the conveyor or an an upper or lower horizontal portion of the conveyor. As before, guide rods 16 are located parallel to the tubular backbone 10 and chain guides 14. On either side of the switch brackets 80 and 82 secure the chain guides 14 and guide rods 16 to the tubular backbone 10. The alternate guide rods 84 slope downward from the switch to provide a gravity feed away from the conveyor. A movable guide rod 86 is hinged at the point 88 and actuated by the link 90 which is below the guide rods 84 and which in turn is actuated by the air cylinder 92. The bracket 82 is extended to support the air cylinder 92. The switch may be actuated by any means conventional in the art such as a signal from a machine that its storage capacity is full or conversely that it is ready to accept more parts. The movable guide rod 86 and the link 90 are rigidly fastened together and the link 90 is movably pinned to the air cylinder piston rod at 94.

In FIG. 8 the elbow 100 joining the inclined portion of an alternate version of the conveyor with an upper horizontal portion of the conveyor is shown 101. In this version the drive train shown in FIG. 6 can be located at the far end of the upper horizontal portion rather than the top of the inclined portion of the conveyor. This version is most useful with multiple discharge exits of the kind shown in FIG. 7. IN FIG. 8 the inclined backbone 11 supports chain guides 14 and 20 as before. Twin sprockets 102 and 104 are also used; however, here the guide rods 17 are curved at 35 around a larger radius as they go around the outer sprocket 104 and the return is around sprocket 102.

I claim:

1. A collecting and distributing conveyor system comprising, an endless linear conveyor, part entrance means to said conveyor, sequential part guiding means leading to said part entrance means, a plurality of part accepting means on said conveyor, means attached to said conveyor between said part accepting means to prevent parts from entering said conveyor, and part exit means from said conveyor.

2. The conveyor system as set forth in claim 1 including part guiding rods substantially parallel to a portion of said endless conveyor.

3. The conveyor system as set forth in claim 2 including part propelling elements attached to said conveyor.

4. The conveyor system as set forth in claim 3 wherein said part propelling elements are laterally extending from said endless conveyor.

5. The conveyor system as set forth in claim 4 wherein said part accepting means are gaps between said laterally extending elements attached to said endless conveyor.

6. The conveyor system as set forth in claim 4 wherein said means to prevent parts from entering are the end surfaces of said laterally extending elements attached to said endless conveyor.

7. The conveyor system as set forth in claim 5 wherein a part in said gap prevents the acceptance of a second part in said gap.

8. A conveyor system as set forth in claim 1 wherein each of said part accepting means is limited to a size which will accept only one part.

9. The conveyor system as set forth in claim 1 wherein a part in a part accepting means prevents the acceptance of a second part in the same particular accepting means.

10. The conveyor system as set forth in claim 1 wherein said entrance means includes space for a variable accumulation of parts awaiting an empty part accepting means.

11. The conveyor system as set forth in claim 1 wherein said conveyor system includes a conveyor drive train and a torque limiting means in the conveyor drive train to provide intermittent oscillation of said endless conveyor at torque levels above a prescribed setting of said torque limiting means.

12. The conveyor system as set forth in claim 11 wherein said torque limiting means includes a ratcheting-type coupling.

13. The conveyor system as set forth in claim 1 wherein said conveyor system incorporates an inclined portion.

14. The conveyor system as set forth in claim 13 wherein said exit means includes at least one exit switch on said inclined portion.

15. The conveyor system as set forth in claim 13 wherein said conveyor system incorporates a substantially abrupt change from a horizontal portion to said inclined portion.

16. The conveyor system as set forth in claim 1 wherein said conveyor system incorporates an inclined portion between substantially horizontal portions.

17. The conveyor system as set forth in claim 16 wherein said exit means includes at least one exit switch on said horizontal portion subsequent said inclined portion.